United States Patent [19]

Uzzo

[11] Patent Number: 4,609,905
[45] Date of Patent: Sep. 2, 1986

[54] TIRE CONDITION MONITORING SYSTEM
[75] Inventor: Anthony P. Uzzo, Dix Hills, N.Y.
[73] Assignee: Eaton Corporation, Cleveland, Ohio
[21] Appl. No.: 609,411
[22] Filed: May 11, 1984
[51] Int. Cl.⁴ .............................................. B60C 23/00
[52] U.S. Cl. ...................................................... 340/58
[58] Field of Search .................. 340/58; 73/146, 146.5, 73/146.2; 200/61.25, 61.22

[56] References Cited

U.S. PATENT DOCUMENTS

| | | | |
|---|---|---|---|
| 2,274,557 | 2/1942 | Morgan et al. | 177/351 |
| 2,894,246 | 7/1959 | De Graffenried | 340/52 |
| 3,092,806 | 6/1963 | Field | 340/58 |
| 3,155,938 | 11/1964 | Meyers | 340/58 |
| 3,662,335 | 5/1972 | Fritze | 340/58 |
| 3,663,387 | 5/1972 | Harrison | 204/141 |
| 3,694,803 | 9/1972 | Strenglein | 340/58 |
| 3,723,966 | 3/1973 | Mueller et al. | 340/58 |
| 3,780,373 | 12/1973 | Holst et al. | 343/788 |
| 3,786,413 | 1/1974 | Ross et al. | 340/48 |
| 3,806,905 | 4/1974 | Strenglein | 340/505 |
| 3,831,161 | 8/1974 | Enabnit | 340/259 |
| 3,858,174 | 12/1974 | Harris | 340/58 |
| 3,881,170 | 4/1975 | Hosaka et al. | 340/52 |
| 3,898,615 | 8/1975 | Hosaka | 340/58 |
| 3,974,477 | 8/1976 | Hester | 340/58 |
| 4,017,826 | 4/1977 | Enabnit | 340/58 |
| 4,052,696 | 10/1977 | Enabnit | 340/58 |
| 4,064,482 | 12/1977 | Maisch et al. | 340/58 |
| 4,072,927 | 2/1978 | O'Neil | 340/58 |
| 4,074,227 | 2/1978 | Kalmus | 340/58 |
| 4,082,960 | 4/1978 | Denamps et al. | 307/118 |
| 4,110,732 | 8/1978 | Jarocha et al. | 340/58 |
| 4,130,817 | 12/1978 | Hill et al. | 340/58 |
| 4,131,878 | 12/1978 | Yasuo | 340/58 |
| 4,180,795 | 12/1979 | Matsuda et al. | 340/58 |
| 4,237,445 | 12/1980 | Crossman | 340/58 |
| 4,242,671 | 12/1980 | Plows | 340/572 |
| 4,267,546 | 5/1981 | Matsuda et al. | 340/58 |
| 4,308,520 | 12/1981 | Darlington | 340/58 |
| 4,507,956 | 4/1985 | Schlesinger et al. | 73/146.5 |

Primary Examiner—James L. Rowland
Assistant Examiner—Brian R. Tumm
Attorney, Agent, or Firm—C. H. Grace; J. G. Lewis

[57] ABSTRACT

Tire pressure monitors (10) are incorporated in vehicles (12) having pneumatic tires (15) to continuously or periodically measure air pressure within each tire and to alert the driver should the pressure in any of the tires fall below a predetermined value. A passive transponder (22) is affixed within the drop center (41) of each wheel (17) and includes a pressure sensing switch (36). An RF transmitter (46) centrally located within the vehicle body interrogates each transponder, either serially or simultaneously. Each transponder, in turn, reflects a predetermined harmonic of the RF signal back to a receiver (48) as a function of the state (open or closed) of its associated pressure switch. The receiver then outputs a signal to a processor/display unit (50) to activate an alarm or indicating device (58).

18 Claims, 7 Drawing Figures

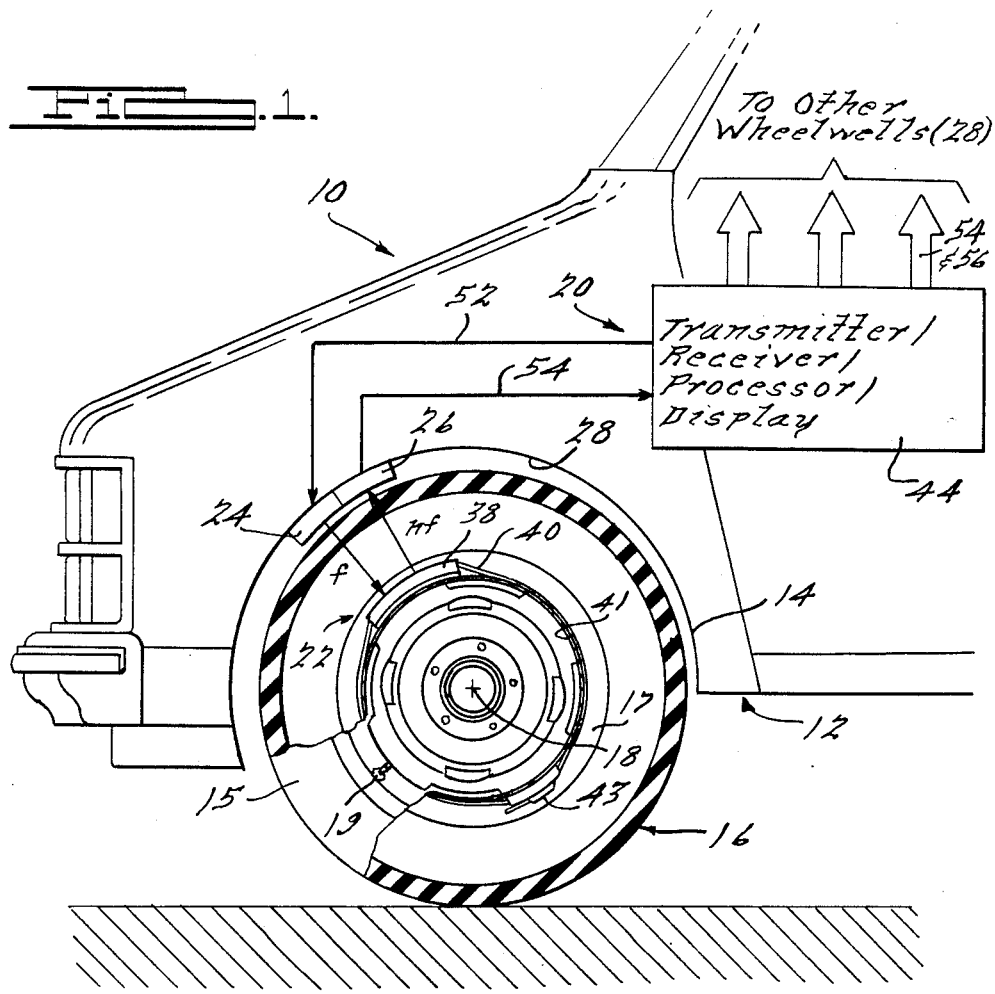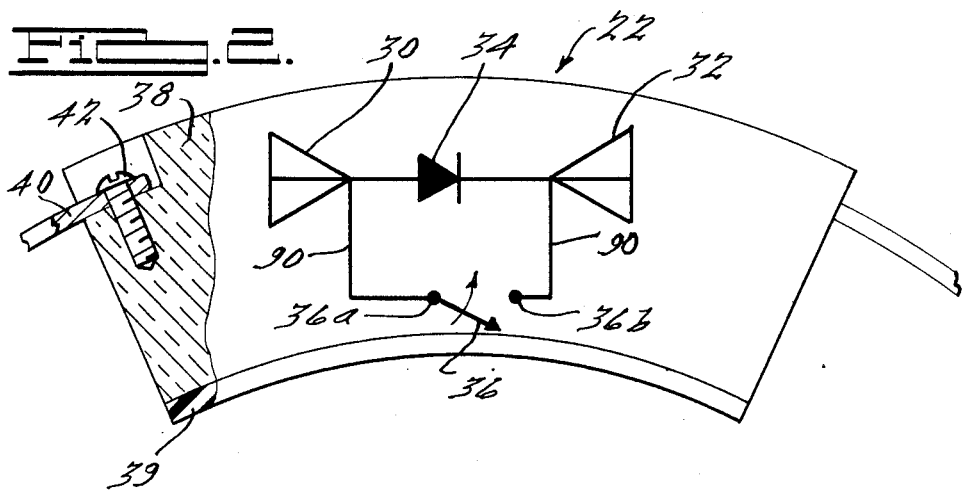

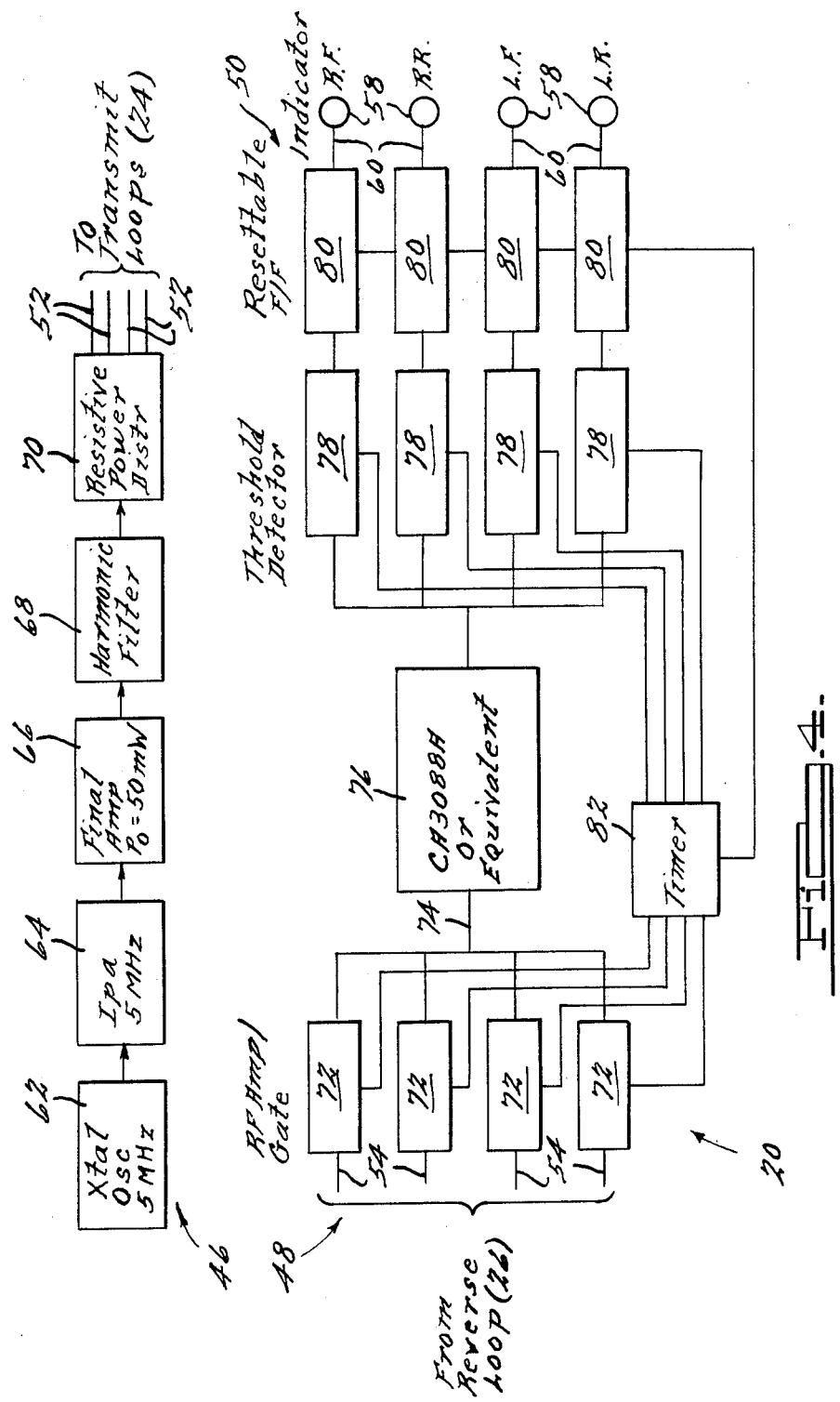

TIRE CONDITION MONITORING SYSTEM

FIELD OF THE INVENTION

The present invention relates to apparatus for monitoring the condition of pneumatic tires and specifically to such systems which continuously monitor fluid pressure in each tire of an associated vehicle and provide a warning signal to the operator should a low tire pressure condition occur.

CROSS REFERENCE

The invention described in the present application is related in certain respects to U.S. Pat. No. 4,507,956 entitled "Circuit Mounting Apparatus".

BACKGROUND OF THE INVENTION

Since the invention of the pneumatic tire and its application to motor vehicles such as automobiles, trucks, and the like, many schemes have been proposed to monitor fluid pressure in tires during operation of an associated vehicle. Such systems facilitate maintaining optimum fluid pressure in pneumatic tires which, in turn, reduces the chances of catastrophic loss of vehicle control as well as extending tire life.

A major problem in any tire pressure monitor is the transmission of fluid pressure information from the tire, i.e., a rotating body, to the operator, i.e., a relatively fixed body. Most prior approaches to this problem fall within three general categories. One approach is the direct reading of fluid pressure in a tire wherein sealed, rotating fittings or electrical slip rings are employed in the interface between the wheel and the vehicle body. A second approach is the transmission of fluid pressure information through an inductive or magnetic coupling involving two transducers, one on the wheel and the other on the vehicle body, which are in precise rotational allignment with one another. A third approach is the application of RF transmitters and receivers which use the atmosphere to bridge the interface between the wheel and body. The first two approaches have several shortcomings. First, relatively expensive high-precision components are needed in the slip rings, and inductive-magnetic coupling transducers must remain in alignment at all times during operation of the vehicle. Additionally, both are prone to corrosion and mechanical wear at the point of interface.

Of the tire pressure monitors which have been commercialized, most have followed the third approach and can be categorized as failing into one of two distinct species. The species are distinguished by having wheel mounted units which are either passive or active. The active type employs a transmitter affixed to each wheel which operates in conjunction with a receiver disposed within the vehicle body. These systems tend to be extremely expensive, however, and require a breaking down of the tire from the wheel in order to service and/or replace the battery which powers the transmitter. Additionally, because the information flow was only one way, few of the prior systems have the ability to verify that the system was operating correctly, i.e., had a self-check feature. Finally, due to the dynamic vibration involved in normal vehicle operation, most active prior systems have generally tended to deteriorate over a relatively short period of time, and those that did not suffer rapid deterioration were prohibitively costly for use with private passenger vehicles.

The passive type of transmitter-receiver system includes an interrogating transmitter and receiver on the body of the vehicle and a passive transponding element mounted to the wheel which receives a transmitted RF signal and selectively reflects the signal back to the receiver as a function of the state of a pressure switch in circuit therewith. Most such transponding elements were either of the tank circuit type, comprising a series connected inductor, capacitor and pressure switch in circuit with an antenna or, of the shorted inductor type in which a coil is arranged in series with a pressure switch which effectively grounds the inductor to prevent a reradiation of the received interrogating signal. Although the patent literature is replete with various passive transponder tire pressure monitoring schemes, few if any have been commercially successful. Federal Communications Commission regulations severely limit the power levels of such transmitters. Furthermore, excessive power level is undesirable because of the likelihood of cross talk between nearby vehicles. Too low a power level, however, will provide an insufficient signal-to-noise ratio, and therefore erratic operation.

Finding a compromise solution for these problems has recently become more urgent in light of government and industry interest in the elimination of "spare" tires for cost and weight reasons and substituting "run flat" tires coupled with a tire pressure monitor.

It will be apparent from a reading of the Specification that the present invention may be advantageously utilized with pneumatic tires intended for many different applications. However, the invention is especially useful when applied to relatively high-speed "on-road" motor vehicles and will be described in connection therewith.

BRIEF DESCRIPTION OF THE INVENTION

The present invention overcomes many of the above-described shortcomings of the prior art by providing a tire condition monitoring system including a passive wheel-mounted transponder with first antenna means for receiving an RF signal having a characteristic frequency f from a remote source, a nonlinear element in circuit with the first antenna means for effecting a distortion of the received RF signal characterized by a harmonic signal of a frequency nf, n being a real number other than 1, second antenna means in circuit with the nonlinear element to radiate the harmonic signal to a remote receiver, and sensor means to disable generation of the harmonic signal in response to a measured variation in a tire condition. This arrangement has the advantage of providing an extremely inexpensive, lightweight and dependable passive transponder for a vehicle tire condition monitor.

According to another aspect of the invention, a transponder such as described hereinabove is included on one or more wheels of a vehicle and is part of a tire condition monitoring system further including transmitter means operative to generate the RF signal and receiver means for providing an operator sensible condition signal in response to receiving the harmonic signal. Both the transmitter and receiver means are mounted on the vehicle body. This arrangement has the advantage of providing a system with a dependable and inexpensive RF communications link between the body and wheels.

According to another aspect of the invention, the two antennas of each transponder are distributed about the outer periphery (or drop center) of the wheel associated therewith to achieve system operation independent of wheel rotational orientation. This arrangement has the advantage of enhancing response time of the system wherein the wheel does not have to be in any particular rotational position for receiving and reflecting RF signals.

According to still another aspect of the invention, the sensor means comprises a tire fluid pressure sensor which disables generation/reflection of the harmonic signal when sensed fluid pressure in an associated wheel-tire assembly falls below a predetermined level.

These and other features and advantages of this invention will become apparent upon reading the following Specification, which, along with the patent drawings describes and discloses a preferred illustrative embodiment of the invention in detail.

The detailed description of the specific embodiment makes reference to the accompanying drawings.

BRIEF DESCRIPTION OF THE DRAWINGS

FIG. 1 is a broken schematic view of a tire condition monitoring system embodying the present invention and packaged within a conventional over-the-road vehicle;

FIG. 2 is a partial broken schematic view of the tire unit of FIG. 1;

FIG. 2b is a broken sectional view of the tire/wheel assembly of FIG. 2a;

FIG. 4 is a detailed block diagram of the vehicle body portion of FIG. 3; and

DETAILED DESCRIPTION OF THE SPECIFIC EMBODIMENT

Figure 2A:
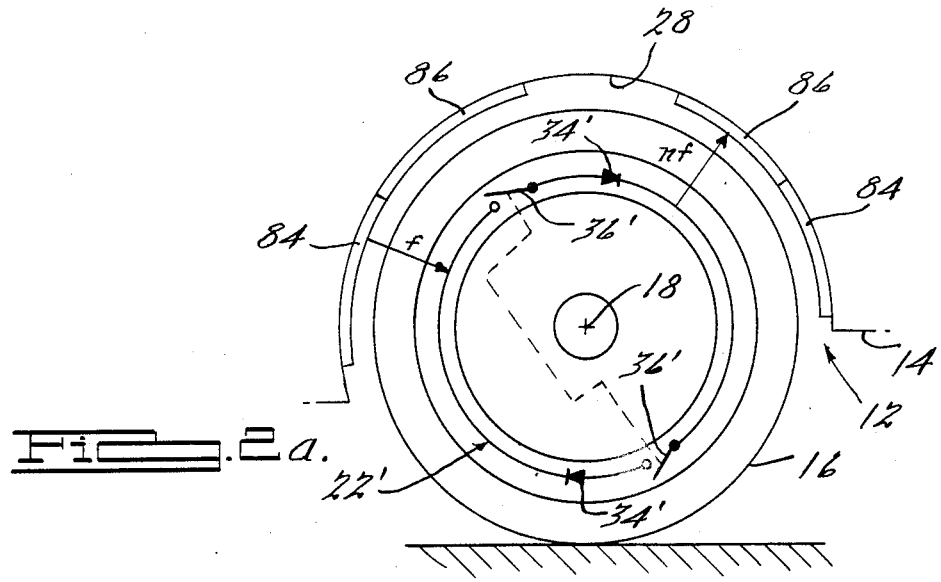
FIG. 2a is a schematic view of alternative embodiment of the invention housed in the vehicle of FIG. 1.

The present invention relates, in its preferred embodiment, to a tire condition (such as pressure) monitoring system which, due to its simplicity, extremely light weight, and low cost, is practical for application with private, passenger motor vehicles. The system has two basic portions or elements, a wheel-mounted passive transponder unit associated with each pneumatic tire and wheel assembly and a transmitter/receiver/signal processing unit or portion located within the body of the associated vehicle. The body borne unit is preferably located near the vehicle operator's designated seating position and includes driver or operator attention-attracting devices (incandescent lights and/or buzzer) therein. As will be described in greater detail hereinbelow, the attention-attracting devices are positioned to accommodate the operator's physiological responses to maximize the likelihood of system-generated tire condition information being transmitted to the operator.

Referring to FIG. 1, a tire condition monitoring system 10 embodying the present invention is illustrated in block diagram form. System 10 is installed with an over-the-road passenger vehicle 12 including a body 14 and a plurality of pneumatic tires 15 and associated wheels 17 assembled in a conventional manner as indicated at 16. Each assembly 16 is mounted to body 14 for rotation about an axis 18. System 10 includes a chassis-mounted portion shown generally at 20 and one or more wheel-mounted portions, generally designated 22. Inasmuch as wheel-mounted portions 22 and certain elements of body-mounted portion 20 are reproduced for each tire/wheel assembly 16 on vehicle 12, the detailed description will address only one assembly 16 for the sake of brevity.

Figure 3:
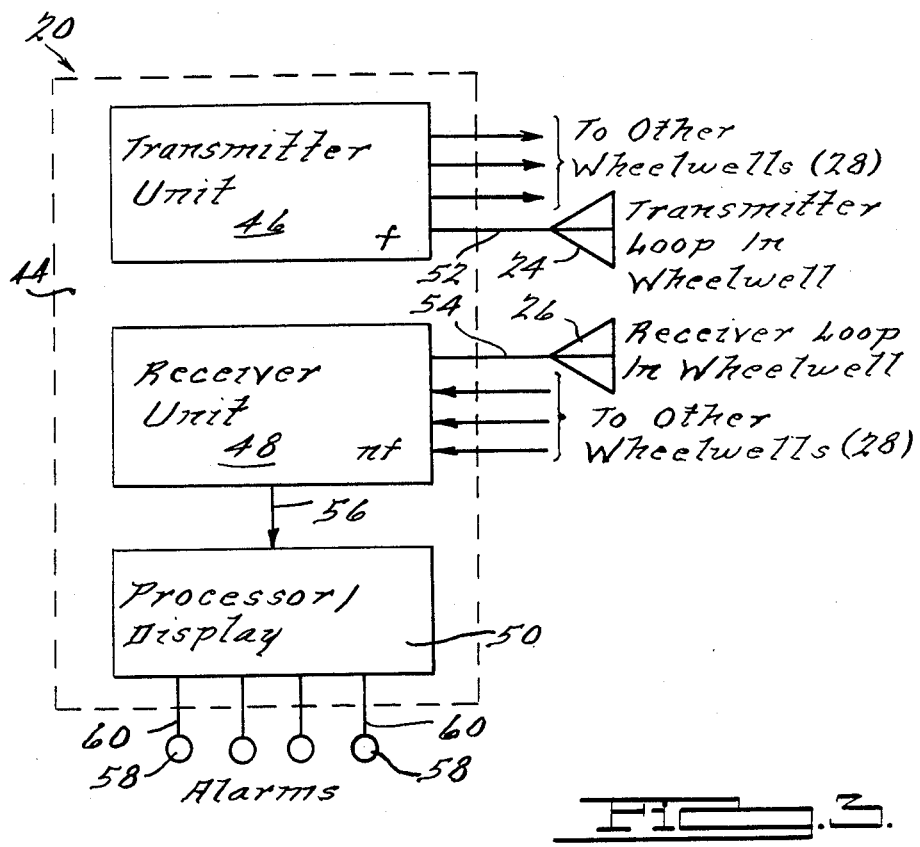
FIG. 3 is a block diagram of the vehicle body portion of the system of FIG. 1.

Referring to FIGS. 1, 2, and 3, in the preferred tire condition monitoring system 10, transmitting and receiving loop antennas, 24 and 26, respectively, are mounted to the vehicle body 14 within a wheel well 28 adjacent the tire/wheel assembly 16 to be monitored. Antennas 24 and 26 are preferably flat printed loops that are flexible and mounted in wheel well 28 in any convenient manner suitable for the harsh environment which they will encounter. The wheel-mounted portion 22 is a passive transponder consisting of a flat pair of receiving and reflecting loop antennas 30 and 32, respectively, of construction similar to antennas 24 and 26. Transponder antennas 30 and 32 also are flexibly mounted within a convenient location such as the drop center 41 of the associated wheel. Antennas 30 and 32 are interconnected by a nonlinear element such as a diode 34 having its anode in circuit with receiving antenna 30 and its cathode in circuit with reflecting antenna 32. Receiving antenna 30 is closely electrically coupled with transmitting antenna 24, and reflecting antenna 32 is closely electrically coupled with body receiving antenna 26. A tire pressure switch 36 is also in circuit with transponder 22 and includes contacts 36a and 36b connected in series with diode 34 to selectively provide a short circuit thereacross should the sensed pressure within the tire/wheel assembly 16 fall outside a predetermined value. In the preferred embodiment, switch 36 contacts close if tire pressure falls below a predetermined level. As should be obvious to one of ordinary skill in the art, switch 36 can be connected in series or in parallel with diode 34 depending upon the provision of a normally open or normally closed contact configuration.

Figure 2B:
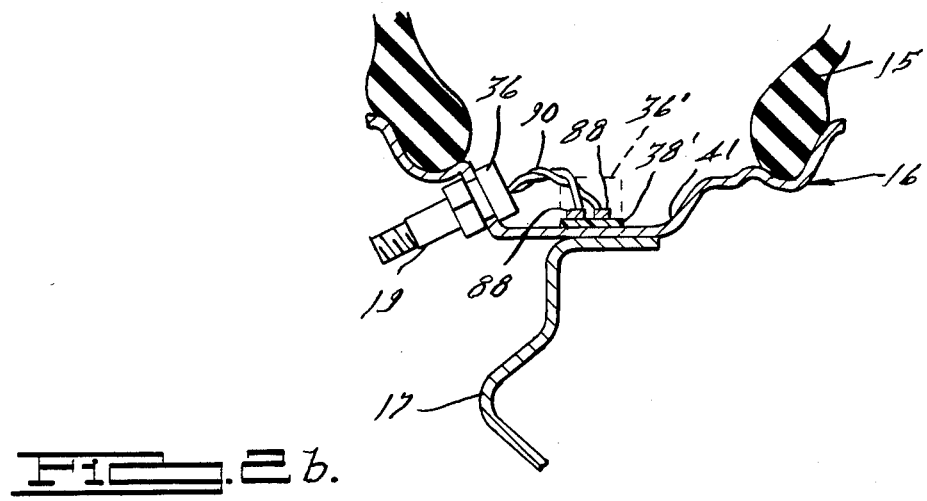

Transponder 22 is carried by an insulating protective substrate 38 disposed circumferentially within the drop center 41 of the associated wheel and held in position by a retention band 40 and suitable fastener means 42 and 43. An impact absorbing and electrically insulating elastomeric member 39 can be provided if necessary intermediate substrate 38 and drop center 41. As is best illustrated in FIG. 2b, an alternative substrate configuration 38' includes a thin flexible band draped circumferentially about drop center 41. The conductors (including antennas 30 and of transponder 22 would comprise etched foil 88 or the like on the outer surface thereof or any suitable equivalent. Substrate 38' would, most likely, be a mylar material to minimize weight and resulting wheel embalance due to the presence of transponder 22. Although any of a number of known pressure switches would be suitable for use in the present invention, devices such as those described in U.S. Pat. Nos. 4,254,312 and 4,335,283 are being particularly applicable due to their temperature compensation feature. Switch 36 can be directly attached to substrate 38' (as shown in phantom at 36') or, alternatively, incorporated within the tire/wheel assembly 16 fill valve 19. In the second case, a pair of conductors 90 are employed to interconnect switch 36 and the remainer of transponder 22.

The body unit 20 comprises a transmitter/receiver/processor/display module 44 including a transmitter unit 46, a receiver unit 48, and a processor/display unit 50. The various units (46, 48, 50) of module 44 receive power from the vehicle's generator-storage system (not illustrated) in the usual manner. Transmitter unit 46 operates to simultaneously or serially output an interrogating RF signal of a known carrier frequency f on shielded lines 52 to transmitting loop antennas 24 in each wheel well 28. Likewise, receiver unit 48 is arranged to serially or simultaneously receive reflected signals from antennas 26 via shielded lines 54.

Receiver unit 48 decodes signals received on lines 54 and outputs a signal on line 56 to the processor/display unit 50. Receiver unit 48 is tuned to receive a signal having a carrier frequency of 3 f or other suitable harmonic of the transmitted signal as will be described in detail hereinbelow. Processor/display unit 50 then decodes the output signal from line 56 and outputs an alarm signal to one or more operator alarm devices via separate alarm lines 60.

Although illustrated as separate and distinct, it is contemplated that units 46, 48, and 50 can be combined into one assembly if desired.

Figure 5:
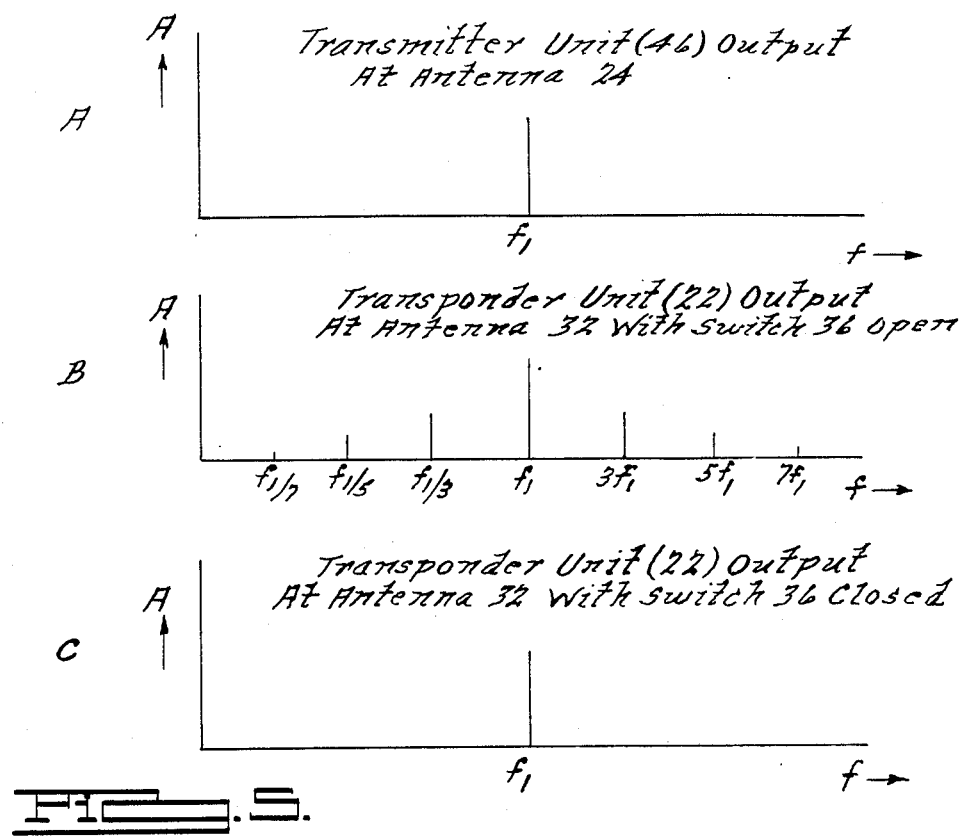
FIG. 5 illustrates several frequency domain waveforms of transmitted and reflected RF signals during operation of the system of FIG. 1.

In operation, a low power RF signal is generated by transmitter unit 46 and applied to the transmitting loops 24 located in each wheel well 28. A single transmitter 46 is used to excite all transmitting loops 24 simultaneously. The transmitter 46 operates at a selected frequency f, (See FIG. 5-A. The transmitted signal is picked up by the transponder receiving antenna 30 and is applied to diode 34, which distorts it, thus producing harmonics. The preferred embodiment of the invention employs the third harmonic 3 f, (see FIG. 5-B). The harmonic signal is radiated by a reflecting loop antenna 32 in transponder unit 22 at 3 f, to be picked up by the receiver loop 26 for amplification and processing. If the pressure in the monitored wheel/tire assembly 16 should fall below a predetermined critical value (or range of temperature-compensated values), pressure switch 36 (normally open) will close, shunting diode 34 and thus elminating the harmonic generation (See FIG. 5-C) so that no signal at 3 f is produced. This response causes the appropriate alarm at the driver display.

In the system 10 actually constructed by the applicant, hand-wound loops were employed for antennas 24, 26, 30, and 32 which provided acceptable performances over distances between 18 and 24 inches using power levels sufficiently low that no FCC licensing would be required. The system was found to work well with both conventional and belted (fiberglass and steel) radial tires. As shown in Table A hereinbelow, the applicant's experiments demonstrated that only negligible RF losses (less than 2 dB) were encountered over a frequency range of 0.1 to 30 MHz. Propagation losses do not appear to be an important consideration in system design. Furthermore, wetting of the tire surface did not change the measured losses.

TABLE A

| Summary of RF Path Losses In (dB) In Tires | | | |
|---|---|---|---|
| Freq. MHz | Rayon Bias Ply | Nylon Radial | Steel Radial |
| 0.3 | 2 | 2 | 2 |
| 0.5 | 1 | 1 | 1 |
| 1.0 | 1 | 1 | 1 |
| 2.0 | 2 | 2 | 2 |
| 5.0 | 2 | 2 | 1 |
| 10.0 | 0 | 2 | 2 |
| 15.0 | 2 | 0 | 2 |
| 30.0 | 1 | 0 | 1 |

Operating frequencies below 30 MHz are considered desirable because hardware at these frequencies is relatively simple and inexpensive. Furthermore, little loss is encountered due to water, snow, dirt accumulation, and the like. However, because a harmonic system is used, the two operating frequencies (f and nf) must not interfere with AM, FM or CB equipment in the automobile. Although both second and third harmonic systems were considered, the third harmonic approach provided the best operation. Two specific operating frequency ranges were considered, 100–500 KHz and 2–25 MHz. The two systems that were actually tested operated at 100–300 KHz and 5–15 MHz. The performance of the 100–300 KHz system was inferior to the performance of the 5–15 MHz system, based upon maximum available separation between units. Furthermore, the tuned circuits necessary at 100–300 KHz are relatively bulky and would be more expensive to fabricate.

The FCC regulation for unlicensed operation (see FCC Rules and Regulations, V 2, August 1976, Part 15 Radio Frequency Devices, Subpart A, General, ¶ 15.7—General Requirements for Restricted Radiation Devices) makes it desirable to operate with as low a frequency as practicable. Therefore, a final choice of operating frequency of 2.5/7.5 MHz should be considered from the standpoint of permitting a 2:1 transmit power increase while remaining within the necessary maximum allowable field strength.

Air core, ferrite core and spiral loop antennas were considered for both the 100/300 system and the 5/15 system. While all three types provided some performance, the spiral loops proved to be best, followed by ferrite core antennas. The spiral loops were therefore employed in most of applicant's testing. The precise shape of the loops is deemed to be relatively unimportant. For example, an elongated spiral works about the same as a circular spiral and provides somewhat better angular coverage. The effect of metallic objects was found to be negligible if the spiral loops are backed with a metallic sheet. As illustrated in FIG. 1, satisfactory operation was obtained with transmit and receive antennas 24 and 26 located adjacent each other in a single assembly.

Selection of the diode 34 is deemed to be the most critical criteria in practicing the present invention. The RF voltage that can be coupled into the tire unit 22 is relatively small. Semiconductor diodes have a conduction band gap such that they conduct poorly until the voltage reaches a suitable level. This is usually in the range of 0.25 v for a germanium diode and 0.5 v for a silicon diode. Germanium diodes are poorly suited for this application because of the relatively harsh environmental characteristics. Therefore, although germanium diodes such as type IN270 were tested, silicon types appear to be a better choice. Schottky barrier diodes also perform poorly because of their wide conduction gap, notwithstanding their excellent environmental characteristics. The best diode was found to be a silicon RF-type IN82, which is used widely for crystal video receivers and, hence, has high sensitivity. Type IN82 diodes are relatively inexpensive and widely used, particularly for low-level detector service.

Because much of the applicant's development employed laboratory breadboard methodology, the equipment employed will be described hereinbelow for the sake of complete disclosure. However, it is contemplated that any commercial production unit would include dedicated circuitry. The applicant's test arrangement employed a Hewlett-Packard Model 606 Signal Generator with a low pass filter, providing about 30 dB of third harmonic rejection incorporated in the output line. The filter loss was 3 dB. The normal output from the generator was +10 dBm (10 mw). The RF power into the transmit antenna is about 4.0 mw (including line loss). Tone modulation, CW, and pulsed operation were attempted. Pulse modulation caused spectral broadening resulting in poorer performance than CW or tone modulation. Tone modulation was found to have no particular advantage over CW operation. The four mw input to the loop produced a field strength (extrapolated from one meter) of about +30 dB ($\mu v/m$; at one meter). The tolerable field of strength is 15 $\mu v$/meter at a distance (D), D equaling approximately ten meters. Extrapolating linearly provides an estimated allowable field strength of +34 dB ($\mu v/m$). Therefore, operation at 2.5/7.5 MHz would provide a six dB margin of compliance.

The receiver employed was an AILTECH Model NN17/27 set for a 10 KHz band width of 15 MHz. The nominal sensitivity of the receiver is about −113 dBM. For the loop experiments, an impedance matching pre-amplifier (a single 2N2222 transistor in an emitter follower configuration) was used to decouple the loop from the 50 ohm receiver input. Test results from the above-described equipment are reported in Table B hereinbelow. As shown, a useful signal-to-noise ratio was obtained over distances of about 24 inches. Very good results were obtained over 18 inches–20 inches distances. Test data was taken with a 10 KHz receiver bandwidth with an RF signal input to the transmitter loop of 4.0 mw. Transmit loop 24 comprised 3.5 turns while the tire unit receiver and reflecting loops 30 and 32 as well as body-receiving loop 26 comprised 7 turns. A major limitation in the proposed system lies in the transmitting loop-to-tire unit receive loop distance since the RF voltage coupled there must be sufficient to achieve adequate nonlinear performance of the diode. The tire unit-to-receive-loop distance is relatively uncritical, however, since the transmit/receive loops are essentially collocated, these distances were usually kept the same. Based upon transformer theory, it is possible that further optimization can improve the coupling between transmit/tire unit loops by further experimentation. With the loop configuration used (elongate spirals), good performance was obtained over an angle of about 120°. The problem of limited angular coverage can be resolved by the use of multiple tire units in an overlapping configuration (such as illustrated in FIG. 2a) because of the extreme low cost of the tire unit assembly. Alternately, the system can be inhibited until the vehicle is in motion, such as the approach suggested in U.S. Pat. No. 4,311,985. In this way, a single tire unit could be acceptable.

TABLE B

| Experimental Results for 5/15 MHz Test System | | |
|---|---|---|
| Test Conditions: | Transmit Loop Power = 4.0 mw | |
| | Receiver IF Bandwith = 10 KHz | |
| Transmit/Tire Unit Distance (Inches) | Receive/Transmit Distance (Inches) | S/N Ratio at Receiver dBv/m |
| 8 | 24 | +46 |
| 10 | 24 | +43 |
| 12 | 24 | +39 |
| 14 | 24 | +33 |
| 16 | 24 | +27 |
| 18 | 24 | +19 |
| 20 | 24 | +12 |
| 22 | 24 | +6 |
| 24 | 24 | +3 |
| 18 | 18 | +23 |
| 18 | 20 | +21 |

TABLE B-continued

| Experimental Results for 5/15 MHz Test System | | |
|---|---|---|
| Test Conditions: | Transmit Loop Power = 4.0 mw | |
| | Receiver IF Bandwith = 10 KHz | |
| Transmit/Tire Unit Distance (Inches) | Receive/Transmit Distance (Inches) | S/N Ratio at Receiver dBv/m |
| 18 | 22 | +20 |
| 18 | 24 | +19 |
| 18 | 26 | +17 |
| 24 | 18 | +12 |
| 24 | 20 | +9 |
| 24 | 22 | +7 |
| 24 | 24 | +3 |
| 24 | 26 | ≈2 dB |

Referring to FIG. 4, a simplified schematic diagram of a production-type system body unit 20 is illustrated. Transmitter unit 46 is of conventional design employing common transistor design (e.g., 2N2222) to provide a stable 50 mw CW signal at 5.0 MHz. This signal is resistably divided and padded to provide the necesary 4.0 mw at each transmit loop. A 5 MHz crystal oscillator 62 controls an IPA (intermediate power amplifier) 64 which, in turn, drives a final amplifier 66 operated Class A. The output of amplifier 66 is interconnected to a harmonic filter 68 which provides suppression of third harmonic output from final amp 66. Transmitter unit 46 output is interconnected to transmit loops 24 through an appropriate resistive power distribution circuit 70 and shielded lines 52.

Receiver unit 48 consists of FET RF amplifiers 72 for each loop. Amplifiers 72 are gated in sequence at 0.1 second intervals to multiplex the four input signals (on lines 54) into a single input line 74 to a single chip AM receiver of the type manufactured by RCA Model CA3088A, including a mixer IF amp, detector, AGC, amplifier, etc. The output of receiver 76 is demultiplexed into four lines by separate threshold detector circuits 78, each driving a retriggerable flip-flop 80 which, in turn, drive visual or audible indicators 58 through lines 60. Preferably, indicators 58 would comprise incandescent lamps arranged with appropriate legends in the operator's field of view to indicate which tire's pressure was out of spec (e.g., right front-R.F.). The timing function of RF amplifiers 72, threshold detectors 78 and flip-flops 80 is effected by a timer circuit 82 of conventional design.

Referring to FIG. 2a, an alternative embodiment of the present invention is illustrated. To accommodate a 360° sensor which would respond to a low-tire pressure condition when the vehicle is stopped and irrespective of the wheel/tire assembly 16 angular position, multiple wheel units were employed. Also, the operating frequency f was raised to the VHF band to provide the capability for a linear resonant half-wave antenna 84 in each wheel well 28. The transponder unit 22' comprises two sets of diodes 34' and switches 36' connected to a resonant wire line in the wheel/tire assembly 16. Additionally, the receiving antenna 86 and receiver (not illustrated) are tuned to the second harmonic sine for improved system performance.

It is to be understood that the invention has been described with reference to a specific embodiment which provides the features and advantages previously described and that such specific embodiment is susceptible of modification, as will be apparent to those skilled in the art. Accordingly, the foregoing description is not to be construed in any limiting sense.

What is claimed is:

1. A tire condition monitoring system comprising:
   transmitter means operative to generate an RF signal having a characteristic frequency f;
   a wheel-mounted passive transponder including,
   (i) first antenna means for receiving said RF signal,
   (ii) a nonlinear element in circuit with said first antenna means to effect a distortion of said RF signal characterized by a harmonic signal of a frequency nf, where n is a real number other than 1,
   (iii) second antenna means in circuit with said nonlinear element to radiate said harmonic signal, and
   (iv) sensor means operative to disable generation of said harmonic signal in response to variation in a monitored tire condition; and
   receiver means for providing a sensible condition signal in response to said harmonic signal.

2. The tire condition monitoring system of claim 1 wherein n is an integer.

3. The tire conditioning monitoring system of claim 1 wherein n is equal to 3.

4. The tire condition monitoring system of claim 1 wherein said first and second antenna means are distributed about the outer periphery of the wheel associated therewith to effect system operation independent of wheel rotational orientation.

5. The tire condition monitoring system of claim 1 wherein said sensor means comprises a tire fluid pressure sensor operative to disable generation of said harmonic signal when sensed fluid pressure in an associated wheel-tire assembly falls below a predetermined level.

6. The tire condition monitoring system of claim 1 wherein said transmitter means and receiver means comprise vehicle body antenna, means disposed adjacent an associated wheel.

7. The tire condition monitoring system of claim 6 wherein said vehicle body antenna means comprises a transmitting antenna associated with said transmitter means and a receiving antenna associated with said receiver means, said transmitting antenna being closely electrically coupled with said transponder first antenna means and said receiving antenna being closely electrically coupled with said transponder second antenna means.

8. The tire condition monitoring system of claim 1 wherein said nonlinear element comprises a diode.

9. A wheel-mounted passive transponder for use in a tire condition monitoring system of the type including a transmitter for generating an RF signal having a characteristic frequency f and a receiver for providing a sensible condition signal in response to variation in a monitored tire condition, said transponder comprising:
   first antenna means for receiving said RF signal;
   a nonlinear element in circuit with said first antenna means to effect a distortion of said RF signal characterized by a harmonic signal of a frequency nf, where n is a real number other than 1;
   second antenna means in circuit with said nonlinear element to radiate said harmonic signal; and
   sensor means operative to disable generation of said harmonic signal in response to variation in a monitored tire condition.

10. A tire pressure monitoring system for use with a vehicle having at least one pneumatic tire and associated mating wheel, said system comprising:
    transmitter means operative to generate an RF signal having a characteristic frequency f;
    a passive transponder mounted on said wheel and including,
    (i) a first antenna for receiving said RF signal,
    (ii) a nonlinear element in circuit with said first antenna to effect a distortion of said RF signal characterized by a harmonic signal of a frequency nf, where n is a real number other than 1,
    (iii) a second antenna in circuit with said nonlinear element to radiate said harmonic signal, and
    (iv) a tire pressure sensor operative to disable generation of said harmonic signal in response to variation in tire pressure from a predetermined set point; and
    receiver means for providing a sensible abnormal tire pressure condition signal in response to said harmonic signal.

11. The tire condition monitoring system of claim 10 wherein said transmitter means comprises a transmitter and an RF signal transmitting antenna, said transmitting antenna disposed on a relatively stationary portion of said vehicle adjacent said tire and closely electrically coupled with said first antenna.

12. The tire condition monitoring system of claim 10 wherein said receiver means comprises a receiver and a harmonic signal receiving antenna, said receiving antenna disposed on a relatively stationary portion of said vehicle adjacent said tire and closely electrically coupled with said second antenna.

13. The tire condition monitoring system of claim 10 wherein said first and second antennas are carried by an elongated flexible insulative substrate disposed within the drop center of said wheel.

14. The tire condition monitor system of claim 13 wherein said nonlinear element comprises a diode.

15. The tire condition monitoring system of claim 14 wherein said diode and sensor are carried by said substrate.

16. The tire condition monitoring system of claim 10 wherein said first and second antennas are distributed about the outer periphery of said wheel within said pneumatic tire to effect system operation independent of wheel rotation orientation.

17. The tire condition monitoring system of claim 10 wherein said pressure sensor is electrically parallel with said nonlinear element.

18. The tire condition monitoring system of claim 10 wherein said pressure sensor is electrically in series with said nonlinear element.

* * * * *